US005080323A

United States Patent [19]

Kreuter

[11] Patent Number: 5,080,323

[45] Date of Patent: Jan. 14, 1992

[54] ADJUSTING DEVICE FOR GAS EXCHANGE VALVES

[75] Inventor: Peter Kreuter, Aachen, Fed. Rep. of Germany

[73] Assignee: Audi A.G., Ingolstadt, Fed. Rep. of Germany

[21] Appl. No.: 654,643

[22] PCT Filed: Jul. 28, 1989

[86] PCT No.: PCT/DE89/00494

§ 371 Date: Apr. 25, 1991

§ 102(e) Date: Apr. 25, 1991

[87] PCT Pub. No.: WO90/01617

PCT Pub. Date: Feb. 22, 1990

[30] Foreign Application Priority Data

Aug. 9, 1988 [DE] Fed. Rep. of Germany ....... 3826975

[51] Int. Cl.[5] .......................... F01L 9/04; F16K 31/06

[52] U.S. Cl. .............................. 251/129.1; 123/90.11; 335/256; 335/262; 335/266

[58] Field of Search .................. 251/129.1; 123/90.11; 335/256, 263, 266

[56] References Cited

U.S. PATENT DOCUMENTS 4,455,543 6/1984 Pischinger et al. .
4,779,582 10/1988 Lequesne ......................... 123/90.11
4,831,973 5/1989 Richeson, Jr. ............... 251/129.1 X

*Primary Examiner*—Arnold Rosenthal
*Attorney, Agent, or Firm*—Jacques M. Dulin; Thomas C. Feix

[57] ABSTRACT

An improved adjusting device for an electromagnetically-actuated, spring-loaded positioning system in displacement engines, such as for lifting gas exchange valves in internal combustion engines. The adjusting device comprises a spring system and two electrically-operated, opposed actuating solenoids, by means of which an anchor plate may be moved therebetween, and held at two distinct positions corresponding to an open and closed position of the gas exchange valve. The fast switching time behavior of the anchor plate is assisted by selectively distributing a ferromagnetic material in a casing (sleeve) around the gap between the two electromagnets. In the preferred embodiment, the effective magnetism of each pole surface is increased by providing the casing with a plurality of holes along its mid-section. This corresponds to the neutral or dead point of the spring system and anchor plate travel between the two electromagnets. Alternate embodiments include: (1) the continuous or stepwise reduction in wall thickness of the casing from its ends to its midpoint; and (2) selectively gradient doping a uniformly thick casing wall with a ferromagnetic material such that the magnetism adjacent each pole surface is increased. The entire adjusting device is easily constructed using currently available solenoid actuators and spring systems.

5 Claims, 1 Drawing Sheet

ADJUSTING DEVICE FOR GAS EXCHANGE VALVES

FIELD

The invention is directed to an improved adjusting device for gas exchange valves in displacement engines of the type employing electromechanically-actuated, spring-biased reciprocating actuators, such as are commonly used for lifting valves of internal combustion engines. More particularly, the invention relates to improved fast switching time behavior between the open and closed positions of gas exchange valves in an internal combustion engine whereby a pair of opposed electromagnetic devices are alternately excited thus attracting a reciprocating spring-biased anchor plate back and forth therebetween. The anchor plate is linked to the rod end of the gas exchange valve such that the engagement of the anchor plate with a pole surface associated with either electromagnet corresponds to either an open or closed position of the gas exchange valve.

BACKGROUND

A similar type of valve adjusting device is known in principal from DE-OS 30 24 109 corresponding to U.S. Pat. No. 4,455,543 (Pischinger et al).

This known device shows a gas exchange valve for an internal combustion engine, the stem of which is joined to the valve disk and has an anchor (or armature) plate which is alternatingly attracted to two opposed actuating solenoids, causing the valve to open or close. Pischinger also discloses the use of a distance spacer and a magnet cover (collectively known in the art as a "casing") which function to affix the tapped winding coils or solenoids and the bias coil within the cylinder head.

Modern day internal combustion engines have made great strides in valve design. The improved valve mechanisms have resulted in improved power output and fuel efficiency, and have also reduced emissions. This in large part is due to improvements in valve timing through the use of solenoid and spring-biased valve actuator assemblies. The prior art methods for improving gas exchange valve switching behavior have been primarily directed to ensuring reliable switching behavior by improving valve stem alignment within the actuator assembly. While this is a starting point for improving valve switching behavior, there is still a need for increasing the speed of the fast switching time behavior of the anchor plate to ensure precise position changes, and to keep up with the interval demands that are placed on gas exchange valves by newer engine designs under normal operating RPM ranges.

One method for accomplishing this is by increasing the magnetic force associated with each electromagnet in order to attract the reciprocating anchor plate. However, this also requires the use of stronger springs in order to compensate for the increased lag time associated with a stronger decaying electromagnetic force upon deenergization of an associated solenoid. This is not a preferred way of achieving faster switching behavior as larger magnetic cores and springs defeat the purpose of designing small and conveniently sized actuator assemblies. Moreover, the reliability of the reciprocating movement of the anchor plate must also be assured. Unduly powerful electromagnetic forces will tend to result in undesirable switching behavior as the associated spring members become fatigued and weakened over long operating periods.

Thus, there is a definite need in the art to improve the speed of fast switching time behavior of gas exchange valves whereby such improvements make optimal use of readily available components associated with current state of the art valve actuator designs.

THE INVENTION

OBJECTS

It is among the objects of the invention to provide an improved solenoid actuated gas exchange valve device having the properties of more rapid fast switching time behavior and reliable movement of the anchor plate device;

It is another object of this invention to provide an improved actuator assembly wherein the high speed or fast switching time behavior of the anchor plate is improved by increasing the effective magnetism of each pole surface of a pair of opposed electromagnets without using larger iron cores;

It is another object of the invention to provide an improved valve actuator system whereby a ferromagnetic casing is provided as a guide member for the reciprocable anchor plate and the casing is selectively sized in cross section to promote the switching speed and behavior of the anchor plate;

It is another object of the invention to provide an improved valve actuator system whereby the effective magnetism of each pole surface of a pair of opposed electromagnets is increased by providing a casing as a guide member for the reciprocating anchor plate wherein the casing is selectively doped with a ferromagnetic material so that the fast time switching speed and behavior of the anchor plate is increased and;

Still other objects will be evident from the following specification, drawings and claims.

DRAWINGS

SUMMARY

Figure 1:
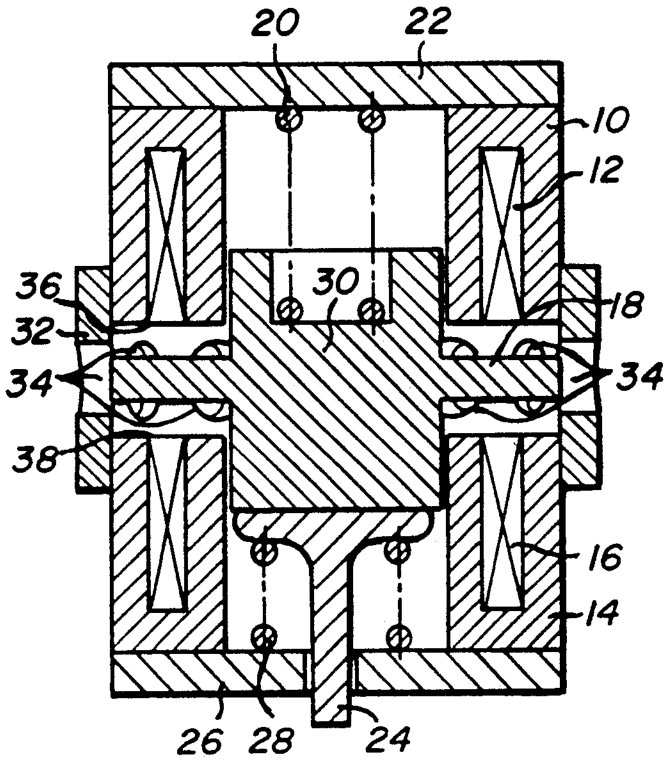
FIG. 1 shows a side elevation, cross-section view of the improved actuator adjusting device of this invention.

I have found that the fast switching time behavior of electromagnetic, spring-biased adjusting devices for gas exchange valves in internal combustion engines may be improved by providing an additional magnetic force to assist the movement of the reciprocating anchor plate associated with these adjusting devices. This may be accomplished by selectively distributing an amount of ferromagnetic material surrounding the pathway of the reciprocating anchor plate.

In the preferred embodiment a casing is provided to surround the actuator assembly. The casing resembles a cylindrical mantle or sleeve which forms an enclosure about the space or gap between the opposed electromagnet cores. This gap is the region where the anchor plate is alternately reciprocated between opposing electromagnet cores and is disposed to engage a pole surface of each electromagnet core as it becomes energized. This reciprocating movement corresponds to the moving of an associated gas exchange valve from a closed to an opened position or vice-versa.

In the preferred embodiment the casing (sleeve) contains a uniform degree (distribution therein) of ferromagnetic material, and is provided with holes or relieved portions along its central region adjacent the gap corresponding to the neutral or locus point of the spring system. In other words, the surrounding ferromagnetism provided by the casing acting on the actuator is significantly reduced in the region of the mantle sleeve corresponding to where the anchor plate approaches its mid-point of travel between the two opposed electromagnets. It has been found that this variable degree (gradient) of lateral outward-attracting magnetic force promotes faster time switching behavior of the anchor plate in its direction of travel towards a pole surface of an electromagnet. This increases the effective magnetism associated with each electromagnet so that the anchor plate is quickly attracted to the affected pole surface upon energization of that electromagnet, since the ferromagnetic material concentration in the surrounding casing/mantle is greatest in the end regions of the mantle adjacent the pole surfaces of the opposed electromagnets.

An alternate embodiment for selectively distributing the ferromagnetism of the casing wall comprises a continuous reduction in thickness in the casing wall from its outer end regions adjacent each pole surface towards its mid-point region adjacent the neutral or dead point of the anchor plate travel. A second alternate embodiment includes a stepwise reduction in the outer wall thickness of the casing similar to the continuous reduction in wall casing embodiment.

A third alternate embodiment of the casing wall includes a uniformly thick wall that is selectively doped with ferromagnetic material. The distribution of the doping is most heavily concentrated at the outer ends of the casing adjacent the pole surfaces of each electromagnet and decreases significantly towards the mid-point of the casing, so there is a doping gradient decrease from the outer ends toward the middle.

In all embodiments the inner cylindrical wall of the casing (i.e., the wall surface directly adjacent the reciprocating anchor plate) is smooth to permit unobstructed reciprocating travel of the anchor plate therewithin.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

FIG. 1 illustrates an isolated view of an adjusting device for a gas exchange valve of the type normally found within the engine block of an internal combustion engine. The adjusting device comprises opposing shielded electromagnetics or iron cores 10 and 14. Each electromagnet is generally U-shaped in cross-section to form a cup magnet and has coils or solenoids 12 and 16 annularly installed therein. The solenoids 12, 16 are aligned parallel to the axis of the annulus coinciding with the axis of valve stem 24. Solenoid 12 is associated with electromagnet 10 and solenoid 16 is associated with electromagnet 14. Each electromagnet 10 and 14 also has associated therewith pole surfaces 36 and 38, respectively. An anchor plate 18, being reciprocable in the vertical direction (as seen in FIG. 1), is provided, and it moves back and forth between each pole surface 36 and 38. The anchor plate 18 also has attached thereto a stem 30 which is disposed to engage the stamp portion 24 of a valve stem associated with a gas exchange valve disc (disc not shown).

As there is no theoretical difference between intake and exhaust valve construction, the following discussion is generic to both types of gas exchange valves.

During the period that the excitement of solenoid 16 is caused to occur, anchor plate 18 is attracted towards pole surface 38 which results in the downward depression of stamp portion 24 and hence moves the gas exchange valve to the open position. Conversely, as anchor plate 18 is attracted by pole surface 36 (i.e., when solenoid 16 is de-energized and solenoid 12 is excited) then the gas exchange valve is moved to the closed position.

Upper and lower coil springs 20 and 28, respectively, being coaligned with the central axis of the valve stem, are provided to bias the anchor plate 18 towards the opposing pole surface of the associated electromagnet. As is seen in FIG. 1, coil spring 20 is constrained at its upper end by top abutment 22 and is disposed to be inserted in and received by a relieved central portion in the stem 30 at its bottom end. In a similar fashion, lower coil spring 28 abuts the top flanged surface **24*a* of stamp portion 24 of the valve stem at its top end and engages lower abutment 26 at its bottom end. When the electromagnets 10 or 14 are not excited, the neutral or dead center (locus) position of the spring system is about in the middle, that is, such that the anchor plate 18 comes to rest in the middle between the two pole surfaces 36 and 38**. For more details on valve actuator assemblies directed to precise and simple adjustment of the valve stroke see my earlier issued U.S. Pat. No. 4,719,882.

In operation, only one of the solenoids 12 or 16 is excited (energized) at any one time. As upper solenoid 12 is energized, anchor plate 18 is attracted towards pole surface 36 which results in the compression of coil spring 20. As solenoid 12 is de-energized and the flow of current through electromagnet 10 is shut off, the spring force of compressed spring 20 overcomes the now decaying electromagnetic force attracting pole surface 36 to the upper surface of anchor plate 18 and anchor plate 18 is moved to a position near the opposing electromagnet 14 where it will be caught by a catch current associated with the energizing of the opposing solenoid 16.

The area between the opposing pole surfaces 36 and 38 is enclosed by the casing 32. In the preferred embodiment, the shape of the casing 32 is in the form of a cylindrical mantle or sleeve and is constructed of a ferromagnetic material in order to assist in the magnetic attraction of the anchor plate 18 in its direction of travel towards a pole surface of an energized electromagnet.

A plurality of holes or relieved portions 34 are provided along casing 32 to encourage the switching behavior of the anchor plate 18 during the above-described periods of alternately excited solenoid action. In the preferred embodiment, the casing 32 has an even distribution of ferromagnetic properties throughout its construction. By placing holes 34 selectively about its mid-portion, the distribution of ferromagnetic properties of casing 34 are greater towards its upper and lower edge regions adjacent the pole surfaces 36 and 38, respectively, and thus, effectively increases the magnetic attraction associated with each pole surface.

While the preferred embodiment discloses the holes 34 as through holes in the sidewall of casing 32, it is understood that other derivations of the preferred embodiment may also result in a smaller ferromagnetic properties of the casing 32 about its mid-section, including but not limited to forming relieved portions that do not extend clear through the thickness of the casing 32 or by a substitution of numerous pits in this region instead of the holes 34.

ALTERNATE EMBODIMENTS

Figure 2:
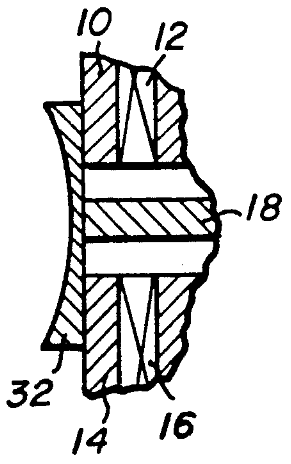
FIG. 2 shows a fragmentary, cross-sectional view of an alternate embodiment for the adjusting device of this invention.
Figure 3:
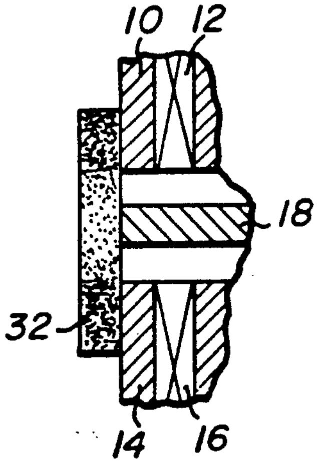
FIG. 3 shows a fragmentary, cross-section view of a second alternate embodiment for the improved adjusting device of this invention.

Alternate embodiments for the construction of casing 32 are shown in FIGS. 2 and 3. For clarification in this description, the index numbers in FIGS. 2 and 3 refer to the same items as in FIG. 1.

As is best seen in FIG. 2, the casing 32 does not have a uniform cross-sectional thickness, but instead has a smoothly decreasing thickness from its upper and lower end to the midpoint of the casing 32. This corresponds to the neutral or dead center of the anchor plate when the actuating valve assembly is in a rest position. It is understood that although the changes in wall thickness are shown as continuous (i.e., a smoothly decreasing thickness of the casing) it is noted that a stepwise decrease towards the central region is also possible and may be preferable from a construction standpoint.

In the embodiment of FIG. 3, no overall annular thickness changes or cutouts are made to the wall thickness of casing 32. Instead, the material composition of the wall is selectively altered. In this embodiment, the material composition adjacent the upper and lower regions of casing 32 is doped to provide a gradient with a greater degree of ferromagnetic material than is provided to the central region. As described above, this increases the effective magnetism associated with each energized electromagnet and thus encourages the fast switching time behavior of the anchor plate 10 from one pole surface to the other.

The design aspects disclosed in FIGS. 1–3 may be combined with each other to form several combinations which achieve the same results of faster switching behavior. For example, the additional holes 34 of FIG. 1 may be combined with the varying wall thickness of FIG. 2 or with the disproportionately (gradient) doped casing 32 of FIG. 3. Likewise, the disproportionately doped casing of FIG. 2 may be combined with the holes 34 of FIG. 1. From the above description it is obvious that other combinations are possible, but for the sake of brevity will not be mentioned here.

It should be understood that various modifications within the scope of this invention can be made by one of ordinary skill in the art without departing from the spirit thereof. I therefore wish my invention to be defined by the scope of the appended claims as broadly as the prior art will permit, and in view of the specification if need be.

I claim:

1. An improved electromagnetically operated, spring-biased actuator assembly for gas exchange valves in internal combustion engines, comprising in operative combination:

a) a first actuating solenoid and a second actuating solenoid, said second actuating solenoid disposed opposite to and spaced from said first actuating solenoid a sufficient distance to define a gap therebetween, both of said solenoids having a ferromagnetic iron core;

b) means for reciprocatingly actuating a gas exchange valve, said gas exchange valve being movable between a first, closed operating position to a second, open operating position;

c) said reciprocating actuator means including a generally disc-shaped anchor plate having a central axis and a peripheral edge spaced outwardly from said axis, said anchor plate disposed to travel between said actuating solenoids and selectively attractable to and guidingly reciprocated between positions of engagement with a pole surface of each of said actuating solenoids, said first actuating solenoid pole surface engagement position corresponding to said closed operating position of said gas exchange valve, and said second actuating solenoid pole surface engagement position corresponding to said open operating position of said gas exchange valve;

d) said anchor plate including:

i) an upper and lower guide stem, each of said guide stems disposed opposite one another and coaxial with the axial center of said anchor plate, ii) said upper guide stem being receivingly engageable by a central axial bore of said first actuating solenoid and said lower guide stem being receivingly engageable by a central axial bore of said second actuating solenoid;

ii) said lower guide stem including means for contacting a coaxially aligned stamp member of a gas exchange valve stem to transfer reciprocating movement of said anchor plate to said gas exchange valve;

e) a spring system for symmetrically stressing said anchor plate and assisting said reciprocating movement upon the appropriate excitation of either of said actuating solenoids;

f) means for improving the switching behavior of said actuator assembly in association with said gap so that the fast time switching of said anchor plate is increased while precise movement between said closed and open operating positions of said anchor plate is maintained.

2. An actuator assembly for gas exchange valves as in claim 1 wherein said means for improving the switching behavior includes:

a) a ferromagnetic perimeter casing member disposed surrounding said anchor plate peripheral edge and bridging said gap; and b) said casing member having a gradient of attractive magnetic force which increases the effective magnetism of the pole surfaces of each of said adjusting solenoids.

3. An actuator assembly for gas exchange valves as in claim 2 wherein:

a) said casing member is a sleeve which has a substantially uniform thickness; and spaced end portions overlapping the pole surface of each of said actuating solenoids; and b) said casing sleeve includes a plurality of holes disposed medially of said overlapping end portions.

4. An actuator assembly for gas exchange valves as in claim 2 wherein said casing has a wall thickness which is thinner at its middle than at said overlapping end portions.

5. An actuator assembly for gas exchange valves as in claim 1 wherein said means for improving the switching behavior includes:

a) a perimeter casing sleeve disposed adjacent said gap and having overlapping end portions extending beyond the pole surfaces of each of said actuating solenoids;

b) said casing sleeve is selectively doped with ferromagnetic material in a gradient distribution to increase the effective magnetism of the pole surfaces of each of said adjusting solenoids.

* * * * *